United States Patent
Hua et al.

(10) Patent No.: US 9,648,154 B1
(45) Date of Patent: May 9, 2017

(54) METHOD AND APPARATUS FOR IMPROVING CALL QUALITY OF HANDS-FREE CALL DEVICE, AND HANDS-FREE CALL DEVICE

(71) Applicant: QINGDAO GOERTEK TECHNOLOGY CO., LTD., Qingdao (CN)

(72) Inventors: Yang Hua, Qingdao (CN); Hongwei Zhou, Qingdao (CN)

(73) Assignee: QINGDAO GOERTEK TECHNOLOGY CO., LTD., Qingdao (CN)

(*) Notice: Subject to any disclaimer, the term of this patent is extended or adjusted under 35 U.S.C. 154(b) by 0 days.

(21) Appl. No.: 15/122,835

(22) PCT Filed: Jun. 29, 2015

(86) PCT No.: PCT/CN2015/082634
§ 371 (c)(1),
(2) Date: Aug. 31, 2016

(87) PCT Pub. No.: WO2016/000585
PCT Pub. Date: Jan. 7, 2016

(30) Foreign Application Priority Data

Jun. 30, 2014 (CN) .......................... 2014 1 0307430

(51) Int. Cl.
*H04M 1/00* (2006.01)
*H04M 1/60* (2006.01)
*H04M 1/03* (2006.01)

(52) U.S. Cl.
CPC ........... *H04M 1/6033* (2013.01); *H04M 1/03* (2013.01)

(58) Field of Classification Search
CPC .............................. H04M 1/6033; H04M 1/03
See application file for complete search history.

(56) References Cited

U.S. PATENT DOCUMENTS

2007/0171524 A1 7/2007 Steinthal et al.
2012/0197638 A1 8/2012 Li et al.
(Continued)

FOREIGN PATENT DOCUMENTS

CN 102111697 6/2011
CN 103079148 5/2013
(Continued)

OTHER PUBLICATIONS

Search Report and Written Opinion issued in App. No. PCT/CN2015/082634 (2015).

*Primary Examiner* — Xin Jia
(74) *Attorney, Agent, or Firm* — Barnes & Thornburg LLP (57) ABSTRACT

The present invention discloses a method and an apparatus for improving the call quality of a hands-free call device, and a hands-free call device. The hands-free call device comprises a transmitter end composed of a main microphone and at least one auxiliary microphone. The method comprises: scanning within an initial first collection angle of a transmitter end; after a voice feature signal is scanned within the first collection angle, according to a direction of the voice feature signal, determining a second collection angle smaller than the first collection angle within the first collection angle; and calibrating the transmitter end to a direction determined by the second collection angle. In this method, voice pickup is conducted using a relatively small voice protection angle, so that the interference from ambient noise can be greatly reduced, to achieve the purpose of improving the transmission signal to noise ratio, thus the directivity of a voice in a hands-free call device during a call is more clear, which improves the call quality.

8 Claims, 5 Drawing Sheets

(56) References Cited

U.S. PATENT DOCUMENTS

2013/0329923 A1   12/2013  Bouse
2014/0050333 A1    2/2014  Li

FOREIGN PATENT DOCUMENTS

| CN | 103475974 | 12/2013 |
| --- | --- | --- |
| CN | 103634721 | 3/2014 |
| CN | 104052851 | 9/2014 |
| CN | 203981982 U | 12/2014 |
| CN | 104570355 | 4/2015 |
| CN | 204705768 U | 10/2015 |

METHOD AND APPARATUS FOR IMPROVING CALL QUALITY OF HANDS-FREE CALL DEVICE, AND HANDS-FREE CALL DEVICE

CROSS REFERENCE TO RELATED APPLICATIONS

This application is a U.S. nationalization under 35 U.S.C. §371 of International Application No. PCT/CN2015/082634, filed Jun. 29, 2015, which claims priority to Chinese Patent Application No. 201410307430.8, filed Jun. 30, 2014. The disclosures set forth in the referenced applications are incorporated herein by reference in their entireties.

FIELD OF THE INVENTION

The present invention relates to the field of hands-free call devices, and particularly, to a method and an apparatus for improving the call quality of a hands-free call device, and a hands-free call device.

BACKGROUND OF THE INVENTION

Hands-free call devices in the prior art, such as smart wrist-wearing devices like smart watch and smart band, usually use a rather large voice protection angle under the hands-free call mode since the position of the smart watch relative to a user's mouth is uncertain, thus much ambient noise is collected during the voice pickup, and the transmission signal to noise ratio is influenced. Meanwhile, sound from the loudspeaker of the hands-free call device such as the smart watch will be heard by not only the caller himself, but also other people nearby, and the private information can be easily leaked. In conclusion, the above defects of the transmitter end and the receiver end lead to not so high a call quality of the hands-free call device in the prior art.

SUMMARY OF THE INVENTION

The present invention provides a method and an apparatus for improving the call quality of a hands-free call device, and a hands-free call device, so as to solve the problem that much ambient noise is collected and the transmission signal to noise ratio is low during a call of the hands-free call device.

According to one aspect of the present invention, a method for improving the call quality of a hands-free call device is provided, wherein the hands-free call device comprises a transmitter end composed of a main microphone and at least one auxiliary microphone, and the method comprises:

scanning within an initial first collection angle of the transmitter end;

after a voice feature signal is scanned within the first collection angle, according to a direction of the voice feature signal, determining a second collection angle smaller than the first collection angle within the first collection angle; and calibrating the transmitter end to a direction determined by the second collection angle.

Wherein, after a voice feature signal is scanned within the first collection angle, according to a direction of the voice feature signal, determining a second collection angle smaller than the first collection angle within the first collection angle comprises:

making a reverse extension line through the main microphone in direction $\gamma 1$ when a voice feature signal is scanned in direction $\gamma 1$ within the initial first collection angle of the transmitter end, drawing a circle by taking the main microphone as a center and a connection line between the main microphone and one of the auxiliary microphones as a radius, and determining intersection of an arc of the circle and the reverse extension line as a virtual microphone of the main microphone;

taking the main microphone and its virtual microphone as a new voice array, defining an angle $\beta 1$ smaller than the first collection angle, and judging in real time whether a voice feature signal is existed within the angle $\beta 1$; if so, determining the angle $\beta 1$ as a second collection angle; and if not, taking the connection line between the main microphone and one of the auxiliary microphones as an axis of symmetry, defining a mirror angle $\beta 2$ of the angle $\beta 1$ with respect to the axis of symmetry, and determining the angle $\beta 2$ as a second collection angle.

Wherein, judging in real time whether a voice feature signal is existed within the angle $\beta 1$ comprises:

detecting envelope energy of the voice feature signal in direction $\gamma 1$, and detecting a zero-crossing rate of the voice feature signal in direction $\gamma 1$ when an energy detection value is larger than a first predetermined threshold; and determining that a voice feature signal is existed in the angle $\beta 1$, when the zero-crossing rate of the voice feature signal in direction $\gamma 1$ reaches a second predetermined threshold.

Wherein, detecting envelope energy of the voice feature signal in direction $\gamma 1$ comprises:

detecting envelope energy through the following formula:

$$\text{power}=0; \text{power}=\text{power}*(1-\text{alpha})+\Sigma_{n=1}^{N} x(n)*x(n)$$

wherein, power is an energy value of the voice feature signal, parameter alpha is a weighted factor, and parameter N is a specific value of voice feature signal at a time point;

detecting a zero-crossing rate of the voice feature signal in direction $\gamma 1$ comprises: detecting a zero-crossing rate through the following formula:

$$Z\_rate = \frac{1}{2}\sum_{m=0}^{N-1} |\text{sgn}[x(n) - \text{sgn}(x(n-1))]|$$

wherein, Z_rate is a zero-crossing rate of the voice feature signal, n is a value among a discrete time series, and $$\text{sgn}[x] = \begin{cases} 1, & x > 0 \\ -1, & x < 0 \end{cases}.$$

Wherein, the hands-free call device further comprises a receiver end composed of at least one loudspeaker, and the method further comprises:

providing a virtual loudspeaker of one loudspeaker in the receiver end with a connection line between the loudspeaker and its virtual loudspeaker directed to direction $\gamma 1$, and defining a third collection angle directed to a direction determined by the second collection angle.

According to another aspect of the present invention, an apparatus for improving the call quality of a hands-free call device is provided, comprising:

a voice feature determination unit configured to scan within an initial first collection angle of a transmitter end; and after a voice feature signal is scanned within the first collection angle, according to a direction of the voice feature signal, determine a second collection angle smaller than the first collection angle within the first collection angle; and a direction calibration unit configured to calibrate the transmitter end to a direction determined by the second collection angle.

Wherein, the apparatus further comprises: a virtual microphone creation unit configured to make a reverse extension line through the main microphone in direction γ1 when a voice feature signal is scanned in direction γ1 within the initial first collection angle of the transmitter end, draw a circle by taking the main microphone as a center and a connection line between the main microphone and one of the auxiliary microphones as a radius, and determine intersection of an arc of the circle and the reverse extension line as a virtual microphone of the main microphone; and an angle determination unit configured to take the main microphone and its virtual microphone as a new voice array, define an angle δ1 smaller than the first collection angle, and judge in real time whether a voice feature signal is existed within the angle δ1; if so, determine the angle β1 as a second collection angle; and if not, take the connection line between the main microphone and one of the auxiliary microphones as an axis of symmetry, define a mirror angle β2 of the angle β1 with respect to the axis of symmetry, and determine the angle β2 as a second collection angle.

Wherein, the angle determination unit is further configured to:

detect envelope energy of the voice feature signal in direction γ1, and detect a zero-crossing rate of the voice feature signal in direction γ1 when an energy detection value is larger than a first predetermined threshold; and determine that a voice feature signal is existed in the angle β1, when the zero-crossing rate of the voice feature signal in direction γ1 reaches a second predetermined threshold.

Wherein, the angle determination unit comprises:

an envelope detection unit configured to detect envelope energy of the voice feature signal in direction γ1 through the following formula:

$$\text{power}=0; \text{power}=\text{power}*(1-\text{alpha})+\Sigma_{n=1}^{N}x(n)*x(n)$$

wherein, power is an energy value of the voice feature signal, parameter alpha is a weighted factor, and parameter N is a specific value of a voice feature signal at a time point; and a zero-crossing detection unit configured to detect a zero-crossing rate of the voice feature signal in direction γ1 through the following formula:

$$Z\_rate = \frac{1}{2}\sum_{m=0}^{N-1}|\text{sgn}[x(n)] - \text{sgn}(x(n-1))|$$

wherein, Z_rate is a zero-crossing rate of the voice feature signal, n is a value among a discrete time series, and $$\text{sgn}[x] = \begin{cases} 1, & x > 0 \\ -1, & x < 0 \end{cases}.$$

Wherein, the apparatus further comprises a receiver end location unit configured to provide a virtual loudspeaker of one loudspeaker in the receiver end with a connection line between the loudspeaker and its virtual loudspeaker directed to direction γ1, and define a third collection angle having a regional extent covering a direction determined by the second collection angle.

According to another aspect of the present invention, a hands-free call device is provided, comprising a transmitter end composed of a main microphone and at least one auxiliary microphone, a receiver end composed of at least one loudspeaker, and the aforementioned apparatus for improving the call quality of the hands-free call device.

By performing a voice calibration location of the transmitter end, the method and apparatus for improving the call quality of a hands-free call device of the present invention narrow the voice pickup angle of the transmitter end into a relatively accurate range, thereby avoiding the voice signal to noise ratio from being influenced by much ambient noise in the voice signal picked up by the transmitter end, solving the problem that the call quality of the hands-free call device is not high, and improving the call quality of the hands-free call device.

Other characteristics and advantages of the present application will be elaborated in the subsequent Description, and they are partly obvious from the Description or acquirable by implementing the present application. The objective and other advantages of the present application can be realized and achieved through the structures particularly pointed out in the Description, claims and drawings.

BRIEF DESCRIPTION OF THE DRAWINGS

The drawings are provided for further understanding of the present invention, and constitute a part of the Description to explain the present invention together with the embodiments of the present invention, rather than restricting the present invention. In which.

DETAILED DESCRIPTION OF THE PREFERRED EMBODIMENTS

The core idea of the present invention is to track the direction of a voice source in real time through a sound source localization technology for microphone array, and at the same time, to determine a voice protection angle smaller than an initial voice protection angle to perform a voice pickup, so that the interference from surrounding ambient noise can be greatly reduced to achieve the purpose of improving a transmission signal to noise ratio. Meanwhile, a directional compensation is made for the loudspeaker array using orientation information of the voice source, so that the produced sound is just directed to the voice source, thereby improving the privacy of reception.

Figure 1:
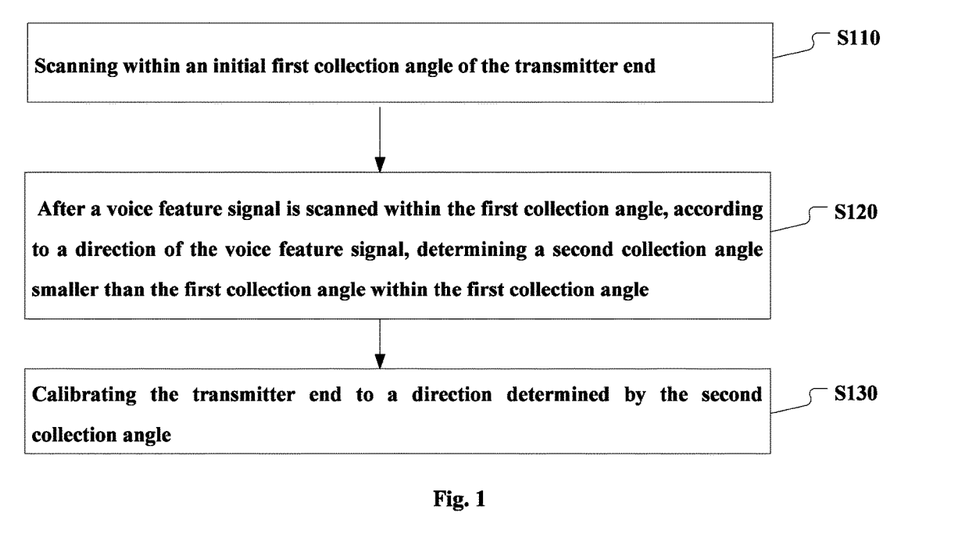
FIG. 1 is a flowchart of a method for improving the call quality of a hands-free call device provided by one embodiment of the present invention.

FIG. 1 is a flowchart of a method for improving the call quality of a hands-free call device provided by one embodiment of the present invention. Referring to FIG. 1, the hands-free call device comprises a transmitter end composed of a main microphone and at least one auxiliary microphone, and the method comprises:

step S110: scanning within an initial first collection angle of the transmitter end;

step S120: after a voice feature signal is scanned within the first collection angle, according to a direction of the voice feature signal, determining a second collection angle smaller than the first collection angle within the first collection angle; and step S130: calibrating the transmitter end to a direction determined by the second collection angle.

Through those steps, the voice protection angle of the transmitter end is narrowed to a smaller angle, and a voice pickup is conducted within the newly determined smaller angle, so that the interference on the voice signal from ambient noise can be avoided to improve the transmission signal to noise ratio, thereby improving the call quality of the hands-free call device.

Figure 2:
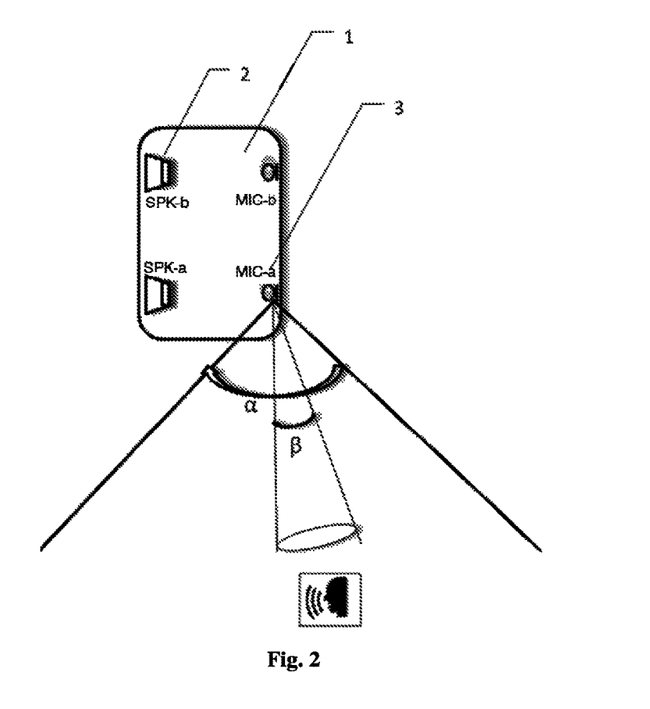
FIG. 2 is a principle diagram of a method for improving the call quality of a hands-free call device provided by one embodiment of the present invention.

FIG. 2 is principle diagram of a method for improving the call quality of a hands-free call device provided by one embodiment of the present invention. Referring to FIG. 2, the hands-free call device 1 comprises: a transmitter end and a receiver end;

the transmitter end comprises a main microphone MIC-a and an auxiliary microphone MIC-b, and the receiver end comprises a main loudspeaker SPK-a and an auxiliary loudspeaker SPK-b;

an angle $\alpha$ is an initial scanning angle of the transmitter end; during a normal communication, the transmitter end collects a signal, i.e., it firstly scans within a larger collection angle $\alpha$, and after a voice feature signal is detected within the angle $\alpha$, it narrows the collection angle to an angle $\beta$ to achieve the purpose of voice location at the transmitter end. The process of voice location at the transmitter end is that the transmitter end scans a voice feature signal within an initial scanning angle $\alpha$, and when a voice feature signal is determined as being existed within an angle $\beta$, the transmitter end is located to a direction determined by the angle, i.e., a position or orientation where the user speaks (as shown in FIG. 2, the range of the angle $\beta$ just covers the position of a head, and the location of the head is more accurate than that made by the angle $\alpha$). The function of the method of the present invention is to narrow the initial scanning angle to a smaller second collection angle $\beta$. Thus the voice protection angle becomes smaller, and the position where a user speaks can be located more accurately, thereby reducing the ambient noise in the voice signal and improving the voice quality.

Figure 3A:
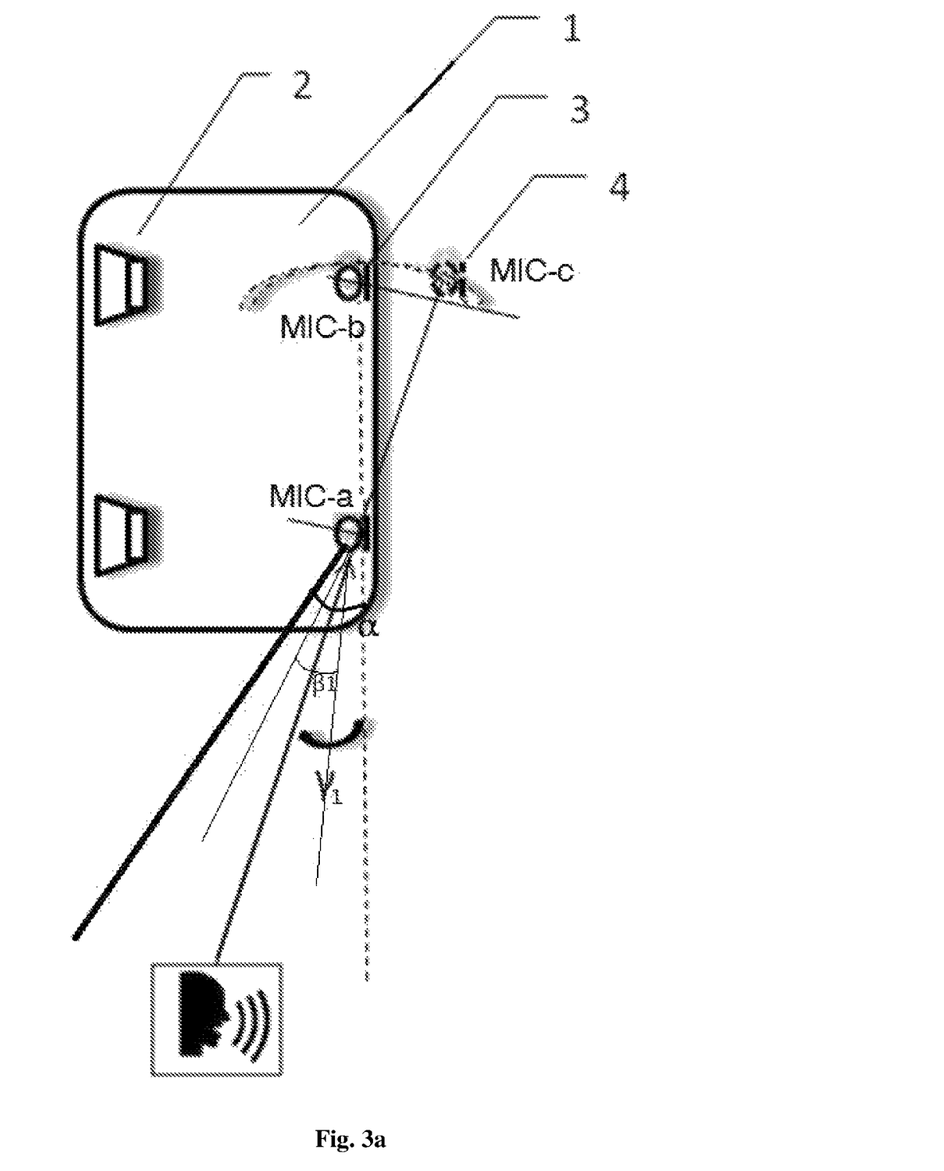
FIG. 3a is a first schematic diagram of a transmitter end calibration provided by one embodiment of the present invention.

FIG. 3a is a first schematic diagram of a transmitter end calibration provided by one embodiment of the present invention. Referring to FIG. 3a, among the reference signs, 1 denotes a hands-free call device, 2 denotes an auxiliary loudspeaker, 3 denotes an auxiliary microphone, and 4 denotes a virtual microphone of a main microphone.

An improvement of the hands-free call device of the present invention is implemented as follows:

referring to FIG. 3a, during a communication, firstly a voice scan is made by the transmitter end within a larger first collection angle $\alpha$, and when a voice feature signal is scanned in direction $\gamma1$ within the first collection angle $\alpha$, a virtual microphone MIC-c is provided in a reverse extension line of the main microphone MIC-a from direction $\gamma1$, so as to be located on an arc which takes the main microphone MIC-a as a center and a connection line between the main microphone MIC-a and the auxiliary microphone MIC-b as a radius. Next, the main microphone MIC-a and the virtual microphone MIC-c constitute a new array, and a directional angle of the new array is defined as a very small second collection angle $\beta1$ directed to a small range in direction $\gamma1$, and the value of $\beta1$ is specifically selected according to different application scenarios.

Since the auxiliary array element is absent, with respect to an array composed of two dot array elements (MIC-a and MIC-c), it is difficult to distinguish whether a voice comes from the left side ($\gamma1$) or the right side ($\gamma2$) of a connection between the main microphone MIC-a and the auxiliary microphone MIC-b. One of the core ideas of the method provided by the present invention is to judge using the virtual microphone MIC-c. The judgment method firstly provides a virtual microphone MIC-c in direction $\gamma1$ as shown in FIG. 3a and forms a directional angle $\beta1$, so as to judge any voice feature signal within the directional angle $\beta1$ in real time; if a voice feature signal is found, the directional angle $\beta1$ is determined as a second collection angle of the transmitter end, and the transmitter end is calibrated to a direction determined by the second collection angle ($\beta1$). If no voice feature signal is found, a virtual microphone MIC-c is immediately provided anew at an opposite mirror side of the connection line between the main microphone MIC-a and the auxiliary microphone MIC-b, so as to judge the direction of the voice.

Figure 3B:
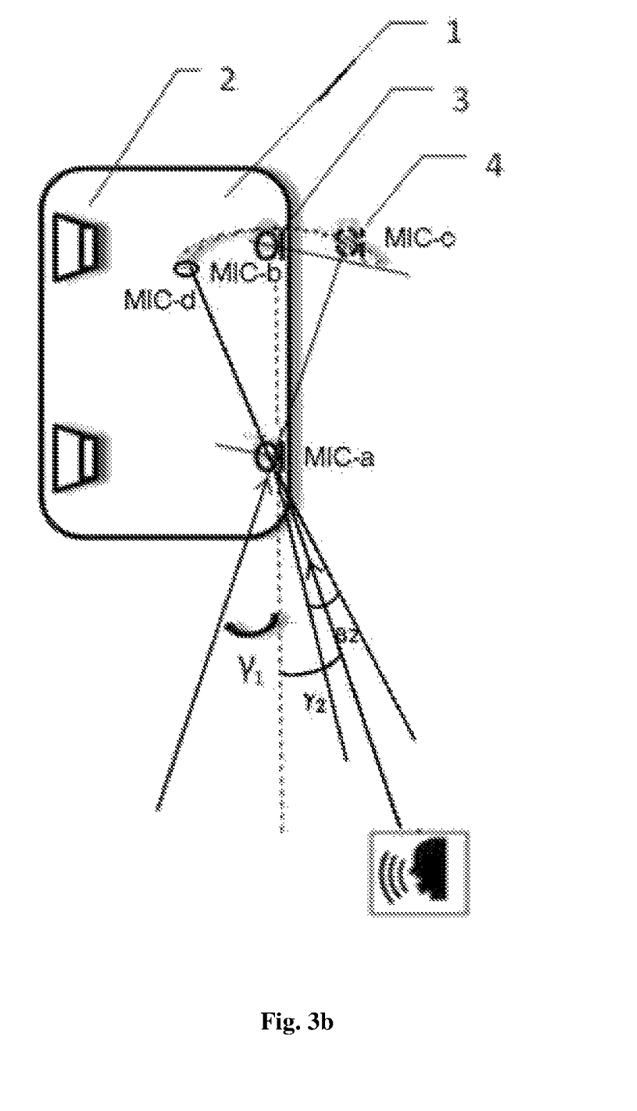
FIG. 3b is a second schematic diagram of a transmitter end calibration provided by one embodiment of the present invention.

FIG. 3b is a second schematic diagram of a transmitter end calibration provided by one embodiment of the present invention. Referring to FIG. 3b, among the reference signs, 1 denotes a hands-free call device, 2 denotes an auxiliary loudspeaker, 3 denotes an auxiliary microphone, and 4 denotes a virtual microphone of a main microphone.

If no voice feature signal is found within the directional angle $\beta1$ as shown in FIG. 3a, a symmetrical angle $\beta2$ of $\beta1$ is provided at the other side of the connection between the main microphone MIC-a and the auxiliary microphone MIC-b as shown in FIG. 3b, and when a voice feature signal is determined as being existed within the angle $\beta2$, the transmitter end is calibrated to a direction determined by $\beta2$. Through the above steps, the location and calibration of the transmitter end are completed to improve the directivity of voice pickup.

Next, the location of the transmitter end is specifically described in conjunction with the judgment of the voice feature signal.

Figure 4:
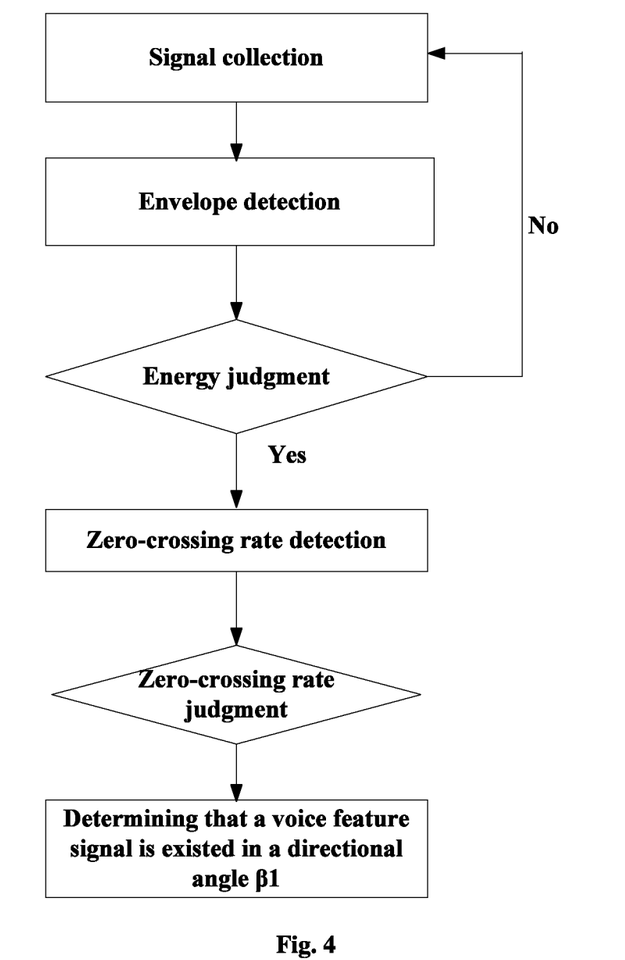
FIG. 4 is flowchart of determination of a voice feature signal provided by one embodiment of the present invention.

FIG. 4 is a flowchart of determination of a voice feature signal provided by one embodiment of the present invention. Referring to FIG. 4, specifically judging in real time whether any voice feature signal is existed within the angle $\beta1$ comprises:

1. collecting a signal, wherein the collected signal is a scanned voice feature signal in direction $\gamma1$;

2. detecting envelope energy of the voice feature signal, and judging whether the energy value is larger than a first predetermined threshold; if so, detecting a zero-crossing rate of the voice feature signal; and if not, returning to determine a direction of the voice feature signal again and a voice feature signal;

3. judging a zero-crossing rate of the voice feature signal; when the zero-crossing rate is larger than a second predetermined threshold, determining that a voice feature signal is existed within the collection angle $\beta1$; taking the directional angle β1 as a smaller second collection angle, so as to calibrate the transmitter end according to the second collection angle.

In this embodiment, detecting envelope energy of the voice feature signal in direction γ1 comprises:

detecting envelope energy through the following formula:

power=0;power=power*(1−alpha)+$\Sigma_{n=1}^{N}x(n)*x(n)$ wherein, power is an energy value of the voice feature signal, parameter alpha is a weighted factor, and parameter N is a specific value of voice feature signal at a time point; wherein the detection sensitivity is controlled by adjusting the two parameters alpha and N, so as to ensure stability of the envelope energy detection. Once the envelope energy power is found to be larger than the first predetermined threshold (set upon actual conditions), the step of detecting the zero-crossing rate is performed.

Detecting the zero-crossing rate of the voice feature signal in direction γ1 comprises:

detecting the zero-crossing rate through the following formula:

$$Z\_rate = \frac{1}{2}\sum_{m=0}^{N-1} |sgn[x(n) - sgn(x(n-1))]|$$

wherein, Z_rate is a zero-crossing rate of the voice feature signal, n is a value among a discrete time series, and $$sgn[x] = \begin{Bmatrix} 1, & x>0 \\ -1, & x<0 \end{Bmatrix}.$$

When the zero-crossing rate Z_rate is larger than the second predetermined threshold, it is deemed that the collected signals within the angle β1 contain a voice feature signal, and a voice action is determined.

After judging that a voice feature signal is existed within the angle β1, the transmitter end is located and calibrated to a range determined by the angle β1. If there is no voice feature signal within the angle β1 (γ1 is not a voice source direction), it is judged whether there is any voice feature signal within an angle β2 symmetrical to β1 about the connection line between MIC-a and MIC-b. At that time, an envelope energy detection and a zero-crossing rate detection may be performed to further verify the voice feature signal within β2.

In conclusion, an accurate location of the transmitter end is achieved by the location of the virtual array element and the detection of the voice feature signal.

Figure 5:
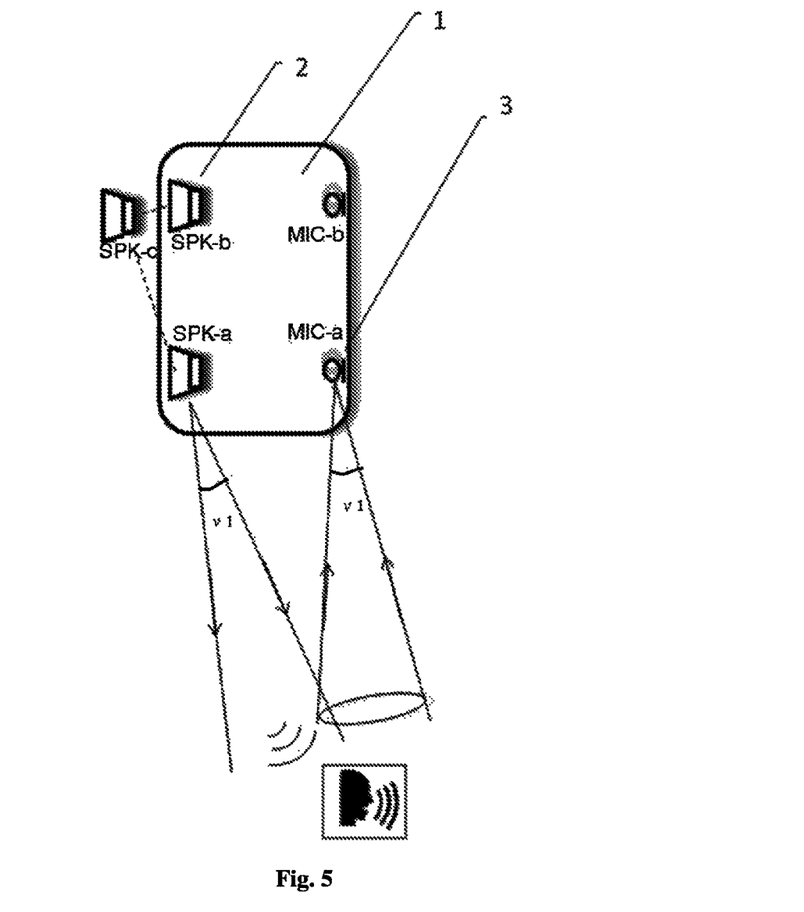
FIG. 5 is a schematic diagram of a receiver end calibration provided by one embodiment of the present invention.

FIG. 5 is a schematic diagram of a receiver end calibration provided by one embodiment of the present invention. Among the reference signs, 1 denotes a hands-free call device, 2 denotes an auxiliary loudspeaker, and 3 denotes a main microphone.

After the transmitter end is located, a directional compensation is made for the loudspeaker array using orientation information of the voice source, so that the produced sound is just directed to the voice source, i.e., a sound producing direction of the loudspeaker array is adjusted, so far as possible, to a position where the user speaks located by the transmitter end, i.e., a direction determined by the second collection angle, thereby improving the privacy of reception. Specifically, a loudspeaker SPK-b is virtualized using a virtual array element technology, and a connection line between a virtual loudspeaker SPK-c and a loudspeaker SPK-a is directed to the voice direction. Next, a directional angle is provided so that a coverage area of the third collection angle (i.e., a regional extent of sound propagation included by the third collection angle) covers a voice direction determined by the second collection angle (as shown in FIG. 5, the angle range below SPK-a covers the position of the head). Preferably, the third collection angle is directly directed to a voice direction determined by the second collection angle.

Referring to FIG. 5, the hands-free call device further comprises a receiver end composed of at least one loudspeaker. After a calibration of the transmitter end is completed by determining the second collection angle and direction, the method further comprises calibrating the receiver end of the hands-free call device, providing a virtual loudspeaker of one loudspeaker in the receiver end with the connection line between the loudspeaker and its virtual loudspeaker directed to direction γ1, and defining a third collection angle directed to a direction determined by the second collection angle. The third collection angle is actually an angle range of sound playing, including the second collection angle and direction, so that the loudspeaker plays towards the orientation of the voice source as much as possible, thereby reducing the voice playing range and improving the privacy of reception.

During usage of the hands-free call device, since a distance between the microphone and the loudspeaker is short, the receiver end may be calibrated in a direction of the voice feature signal determined during the calibration of the transmitter end.

Referring to FIG. 5, a virtual loudspeaker SPK-c of the auxiliary loudspeaker SPK-b is provided in a reverse extension line of the main loudspeaker SPK-a from direction γ1, so as to be located on an arc which takes the main loudspeaker SPK-a as a center and a connection line between the main loudspeaker SPK-a and the auxiliary loudspeaker SPK-b as a radius. The main loudspeaker SPK-a and the virtual loudspeaker SPK-c constitute a new array, and a directional angle of the new array is defined as a third collection angle directed to a direction determined by the second collection angle, which is determined during calibration of the transmitter end, so as to complete the location and calibration of the receiver end.

It shall be appreciated that those angles occurring in FIGS. 3a, 3b and 5 are for the purpose of exemplarily describing the angle ranges for locating the transmitter end and the receiver end, and the angular dimensions are not actual. The embodiments of the present invention improve the signal to noise ratio of the hands-free voice signal by locating and calibrating the transmitter end, and improve the privacy of reception by locating the receiver end.

In conclusion, by calibrating the transmitter end and the receiver end, the method for improving the call quality of the hands-free call device of the present invention reduces the interference from ambient noise, improves the transmission signal to noise ratio, and achieves the purpose of improving the call quality of the hands-free call device. In addition, it performs a direction compensation for the loudspeaker array, so that the produced sound is just directed to the voice source, thereby improving the privacy of reception and the user experience. The method can be applied to a smart device having the hands-free call function, such as a smart watch, and greatly improves the call performance of the smart device.

Figure 6:
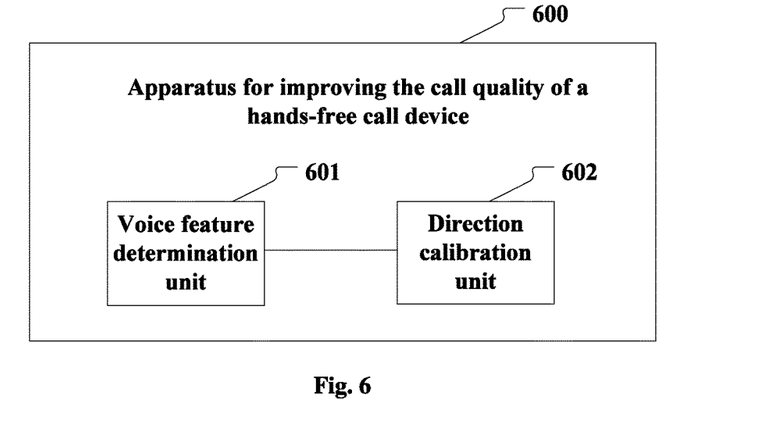
FIG. 6 is a block diagram of an apparatus for improving the call quality of a hands-free call device provided by one embodiment of the present invention.

According to another aspect of the present invention, an apparatus for improving the call quality of a hands-free call device is provided. FIG. 6 is a block diagram of an apparatus for improving the call quality of a hands-free call device provided by one embodiment of the present invention, wherein the apparatus 600 comprises:

a voice feature determination unit 601 configured to scan within an initial first collection angle of a transmitter end; and after a voice feature signal is scanned within the first collection angle, according to a direction of the voice feature signal, determine a second collection angle smaller than the first collection angle within the first collection angle; and a direction calibration unit 602 configured to calibrate the transmitter end to a direction determined by the second collection angle.

Wherein, the apparatus further comprises a virtual microphone creation unit configured to make a reverse extension line through the main microphone in direction γ1 when a voice feature signal is scanned in direction γ1 within the initial first collection angle of the transmitter end, draw a circle by taking the main microphone as a center and a connection line between the main microphone and one of the auxiliary microphones as a radius, and determine intersection of an arc of the circle and the reverse extension line as a virtual microphone of the main microphone; and an angle determination unit configured to take the main microphone and its virtual microphone as a new voice array, define an angle β1 smaller than the first collection angle, and judge in real time whether a voice feature signal is existed within the angle β1; if so, determine that angle β1 as a second collection angle; and if not, take a connection line between the main microphone and one of the auxiliary microphones as an axis of symmetry, define a mirror angle β2 of the angle β1 with respect to the axis of symmetry, and determine the angle β2 as a second collection angle.

Wherein, the angle determination unit is further configured to, detect envelope energy of the voice feature signal in direction γ1, and detect a zero-crossing rate of the voice feature signal in direction γ1 when the energy detection value is larger than a first predetermined threshold;

determine that a voice feature signal is existed in the angle β1, when the zero-crossing rate of the voice feature signal in direction γ1 reaches a second predetermined threshold.

Wherein, the angle determination unit comprises:

an envelope detection unit configured to detect envelope energy of the voice feature signal in direction γ1 through the following formula:

power=0;power=power*(1−alpha)+$\Sigma_{n=1}^{N} x(n) * x(n)$ wherein, power is an energy value of the voice feature signal, parameter alpha is a weighted factor, and N is a specific value of the voice feature signal at a time point;

a zero-crossing detection unit configured to detect a zero-crossing rate of the voice feature signal in direction γ1 through the following formula:

$$Z\_rate = \frac{1}{2} \sum_{m=0}^{N-1} |sgn[x(n)] - sgn(x(n-1))|$$

wherein, Z_rate is a zero-crossing rate of the voice feature signal, n is a value among a discrete time series, and $$sgn[x] = \begin{Bmatrix} 1, & x > 0 \\ -1, & x < 0 \end{Bmatrix}.$$

Wherein, the apparatus further comprises a receiver end location unit configured to provide a virtual loudspeaker of one loudspeaker in the receiver end with a connection line between the loudspeaker and its virtual loudspeaker directed to direction γ1, and define a third collection angle having a regional extent covering a direction determined by the second collection angle.

According to another aspect of the present invention, a hands-free call device is provided, comprising a transmitter end composed of a main microphone and at least one auxiliary microphone, a receiver end composed of at least one loudspeaker, and the aforementioned apparatus for improving the call quality of the hands-free call device.

To be noted, the transmitter end and the receiver end of the hands-free call device of the present invention can be improved in the aforementioned method for improving the hands-free call quality. But under some application scenarios, the hands-free call device only comprises a transmitter end or a receiver end. In that case, the receiver end may be improved in the method for improving the hands-free call quality at the receiver end in the embodiment of the present invention, or the transmitter end may be improved in the method for improving the hands-free call quality at the transmitter end in the embodiment of the present invention. That is to say, the method for improving the hands-free call quality at the receiver end and at the transmitter end in the present invention can be implemented separately, which are omitted herein.

The above descriptions are just preferred embodiments of the present invention, rather than restrictions to the protection scope of the present invention. Any amendment, equivalent replacement, improvement, etc. made within the spirit and principle of the present invention shall fall within the protection scope of the present invention.

The invention claimed is:

1. A method for improving the call quality of a hands-free call device that comprises a transmitter end composed of a main microphone and at least one auxiliary microphone, wherein the method comprises:

scanning a voice feature signal within an initial first collection angle of the transmitter end;

after a voice feature signal is scanned within the first collection angle, according to a direction of the voice feature signal, determining a second collection angle smaller than the first collection angle within the first collection angle; and calibrating the transmitter end to a direction determined by the second collection angle;

wherein after a voice feature signal is scanned within the first collection angle, according to a direction of the voice feature signal, determining a second collection angle smaller than the first collection angle within the first collection angle comprises:

making a reverse extension line through the main microphone in direction γ1 when a voice feature signal is scanned in direction γ1 within the initial first collection angle of the transmitter end, drawing a circle by taking the main microphone as a center and a connection line between the main microphone and one of the auxiliary microphones as a radius, and determining intersection of an arc of the circle and the reverse extension line as a virtual microphone of the main microphone;

taking the main microphone and its virtual microphone as a new voice array, defining an angle β1 smaller than the first collection angle, and judging in real time whether a voice feature signal is existed within the angle β1; if so, determining the angle β1 as a second collection angle; and if not, taking the connection line between the main microphone and one of the auxiliary microphones as an axis of symmetry, defining a mirror angle β2 of the angle β1 with respect to the axis of symmetry, and determining the angle β2 as a second collection angle.

2. The method according to claim 1, wherein judging in real time whether a voice feature signal is existed within the angle β1 comprises:

detecting envelope energy of the voice feature signal in direction γ1, and detecting a zero-crossing rate of the voice feature signal in direction γ1 when an energy detection value is larger than a first predetermined threshold; and determining that a voice feature signal is existed in the angle β1, when the zero-crossing rate of the voice feature signal in direction γ1 reaches a second predetermined threshold.

3. The method according to claim 2, wherein detecting envelope energy of the voice feature signal in direction γ1 comprises:

detecting envelope energy through the following formula:

$$\text{power}=0; \text{power}=\text{power}*(1-\text{alpha})-\Sigma_{n=1}^{N}x(n)*x(n)$$

wherein, power is an energy value of the voice feature signal, parameter alpha is a weighted factor, and parameter N is a specific value of voice feature signal at a time point;

detecting a zero-crossing rate of the voice feature signal in direction γ1 comprises: detecting a zero-crossing rate through the following formula:

$$Z\_rate = \frac{1}{2}\sum_{m=0}^{N-1} |\text{sgn}[x(n)-\text{sgn}(x(n-1))]|$$

wherein, Z_rate is a zero-crossing rate of the voice feature signal, n is a value among a discrete time series, and $$\text{sgn}[x] = \begin{Bmatrix} 1, & x>0 \\ -1, & x<0 \end{Bmatrix}.$$

4. The method according to claim 1, wherein the hands-free call device further comprises a receiver end composed of at least one loudspeaker, and wherein the method further comprises:

providing a virtual loudspeaker of one loudspeaker in the receiver end with a connection line between the loudspeaker and its virtual loudspeaker directed to direction γ1, and defining a third collection angle having a regional extent covering a direction determined by the second collection angle.

5. An apparatus for improving the call quality of a hands-free call device that comprises a transmitter end composed of a main microphone and at least one auxiliary microphone, comprising:

a voice feature determination unit configured to scan a voice feature signal within an initial first collection angle of a transmitter end; and after a voice feature signal is scanned within the first collection angle, according to a direction of the voice feature signal, determine a second collection angle smaller than the first collection angle within the first collection angle; and a direction calibration unit configured to calibrate the transmitter end to a direction determined by the second collection angle;

wherein the voice feature determination unit comprising:

a virtual microphone creation unit configured to make a reverse extension line through the main microphone in direction γ1 when a voice feature signal is scanned in direction γ1 within the initial first collection angle of the transmitter end, draw a circle by taking the main microphone as a center and a connection line between the main microphone and one of the auxiliary microphones as a radius, and determine intersection of an arc of the circle and the reverse extension line as a virtual microphone of the main microphone; and an angle determination unit configured to take the main microphone and its virtual microphone as a new voice array, define an angle β1 smaller than the first collection angle, and judge in real time whether a voice feature signal is existed within the angle β1; if so, determine the angle β1 as a second collection angle; and if not, take the connection line between the main microphone and one of the auxiliary microphones as an axis of symmetry, define a mirror angle β2 of the angle β1 with respect to the axis of symmetry, and determine the angle β2 as a second collection angle.

6. The apparatus according to claim 5, wherein the angle determination unit is further configured to:

detect envelope energy of the voice feature signal in direction γ1, and detect a zero-crossing rate of the voice feature signal in direction γ1 when an energy detection value is larger than a first predetermined threshold; and determine that a voice feature signal is existed in the angle β1, when the zero-crossing rate of the voice feature signal in direction γ1 reaches a second predetermined threshold;

the angle determination unit comprises:

an envelope detection unit configured to detect envelope energy of the voice feature signal in direction γ1 through the following formula:

$$\text{power}=0; \text{power}=\text{power}*(1-\text{alpha})-\Sigma_{n=1}^{N}x(n)*x(n)$$

wherein, power is an energy value of the voice feature signal, parameter alpha is a weighted factor, and parameter N is a specific value of a voice feature signal at a time point; and a zero-crossing detection unit configured to detect a zero-crossing rate of the voice feature signal in direction γ1 through the following formula:

$$Z\_rate = \frac{1}{2}\sum_{m=0}^{N-1} |\text{sgn}[x(n)-\text{sgn}(x(n-1))]|$$

wherein, Z_rate is a zero-crossing rate of the voice feature signal, n is a value among a discrete time series, and $$\text{sgn}[x] = \begin{Bmatrix} 1, & x>0 \\ -1, & x<0 \end{Bmatrix}.$$

7. The apparatus according to claim 5, wherein the hands-free call device further comprises a receiver end composed of at least one loudspeaker, and wherein the apparatus further comprising:

a receiver end location unit configured to provide a virtual loudspeaker of one loudspeaker in the receiver end with a connection line between the loudspeaker and its virtual loudspeaker directed to direction $\gamma 1$, and define a third collection angle having a regional extent covering a direction determined by the second collection angle.

8. A hands-free call device, comprising a transmitter end composed of a main microphone and at least one auxiliary microphone, a receiver end composed of at least one loudspeaker, and the apparatus according to claim 5.

* * * * *